Nov. 1, 1932.  W. H. HUNT  1,885,829
FISH FIN AND TAIL GUIDE MEANS FOR FILLETING MACHINES
Filed Jan. 15, 1931  3 Sheets-Sheet 1
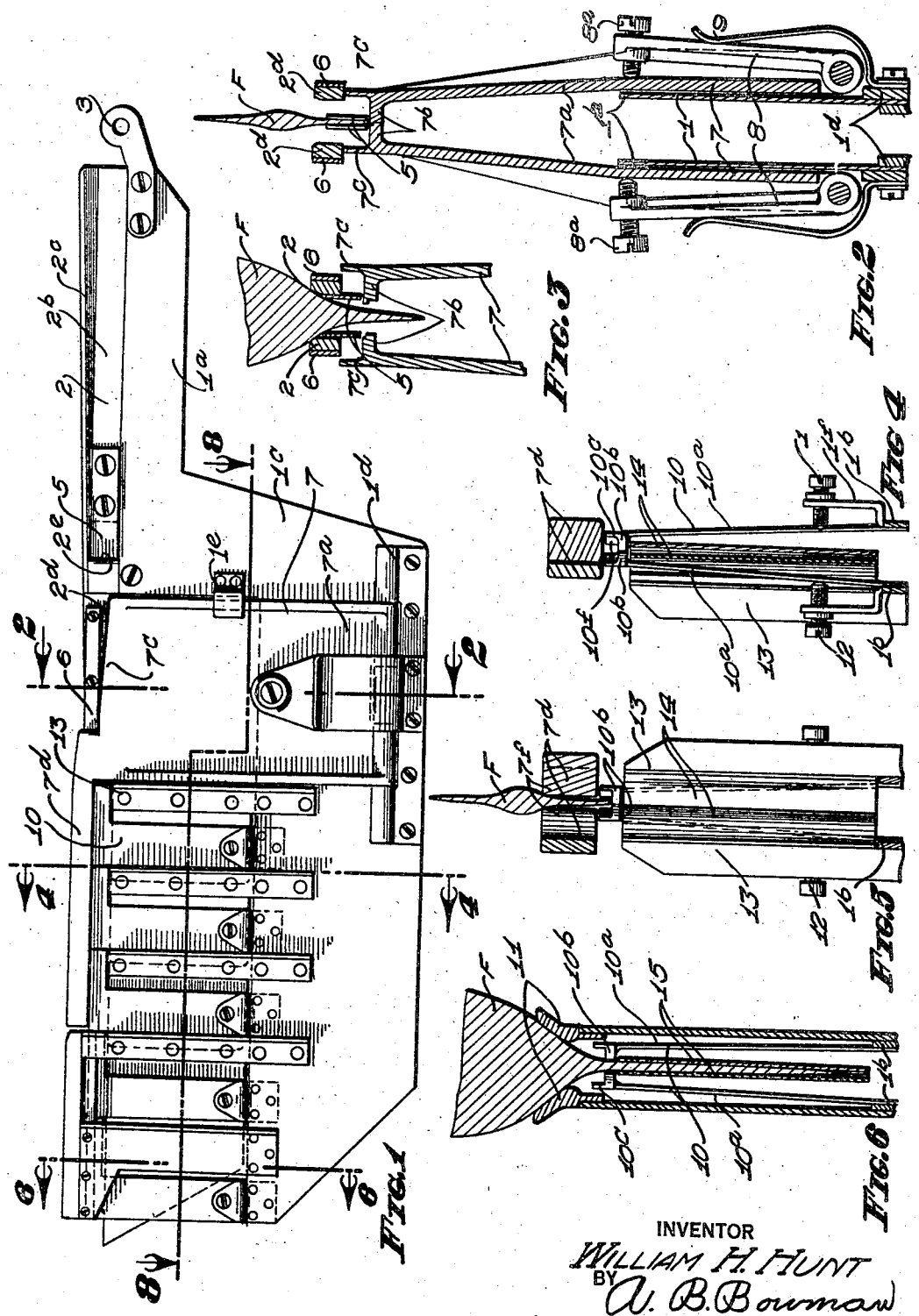
INVENTOR
WILLIAM H. HUNT
BY
A. B. Bowman
ATTORNEY

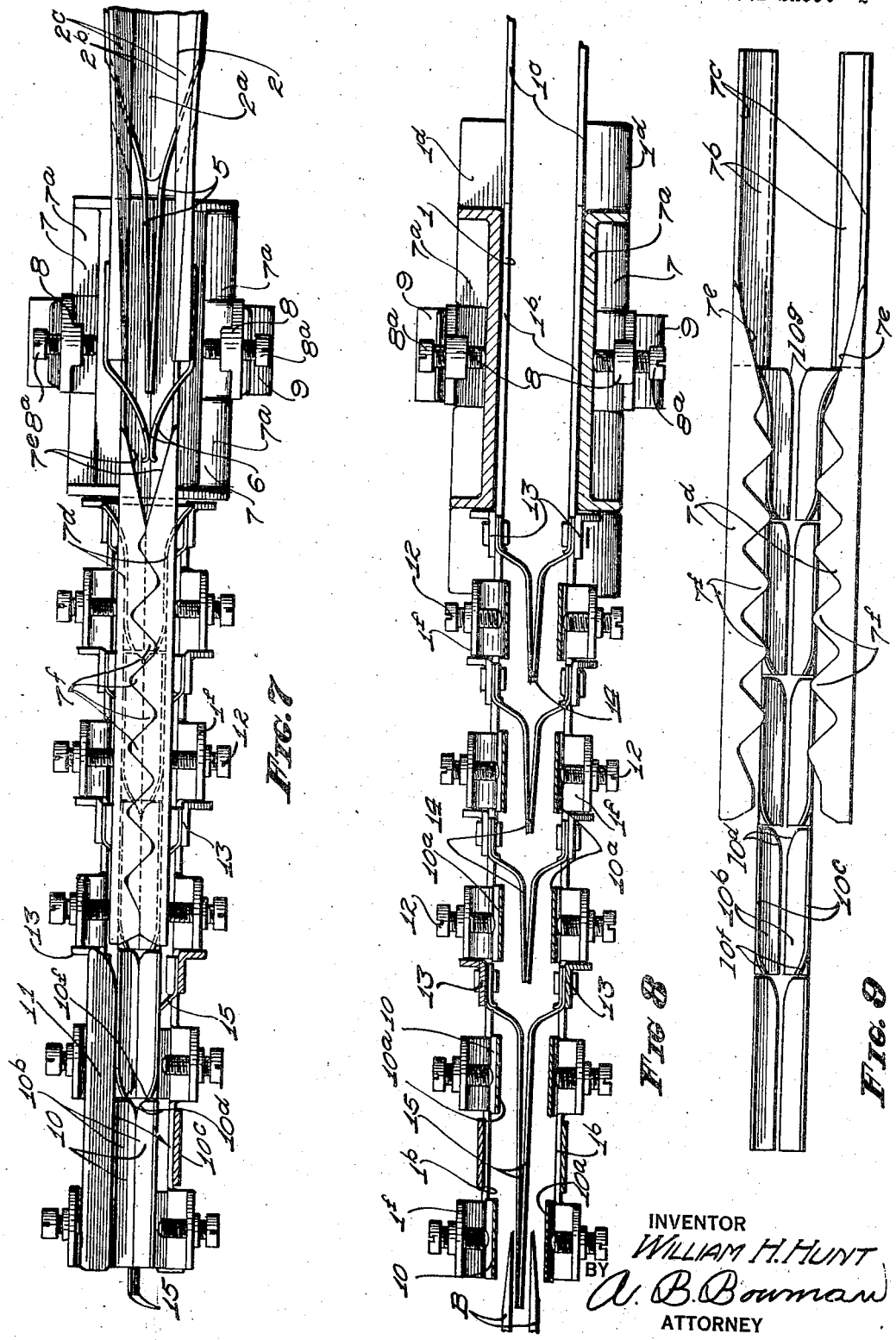

Nov. 1, 1932.  W. H. HUNT  1,885,829
FISH FIN AND TAIL GUIDE MEANS FOR FILLETING MACHINES
Filed Jan. 15, 1931  3 Sheets-Sheet 3
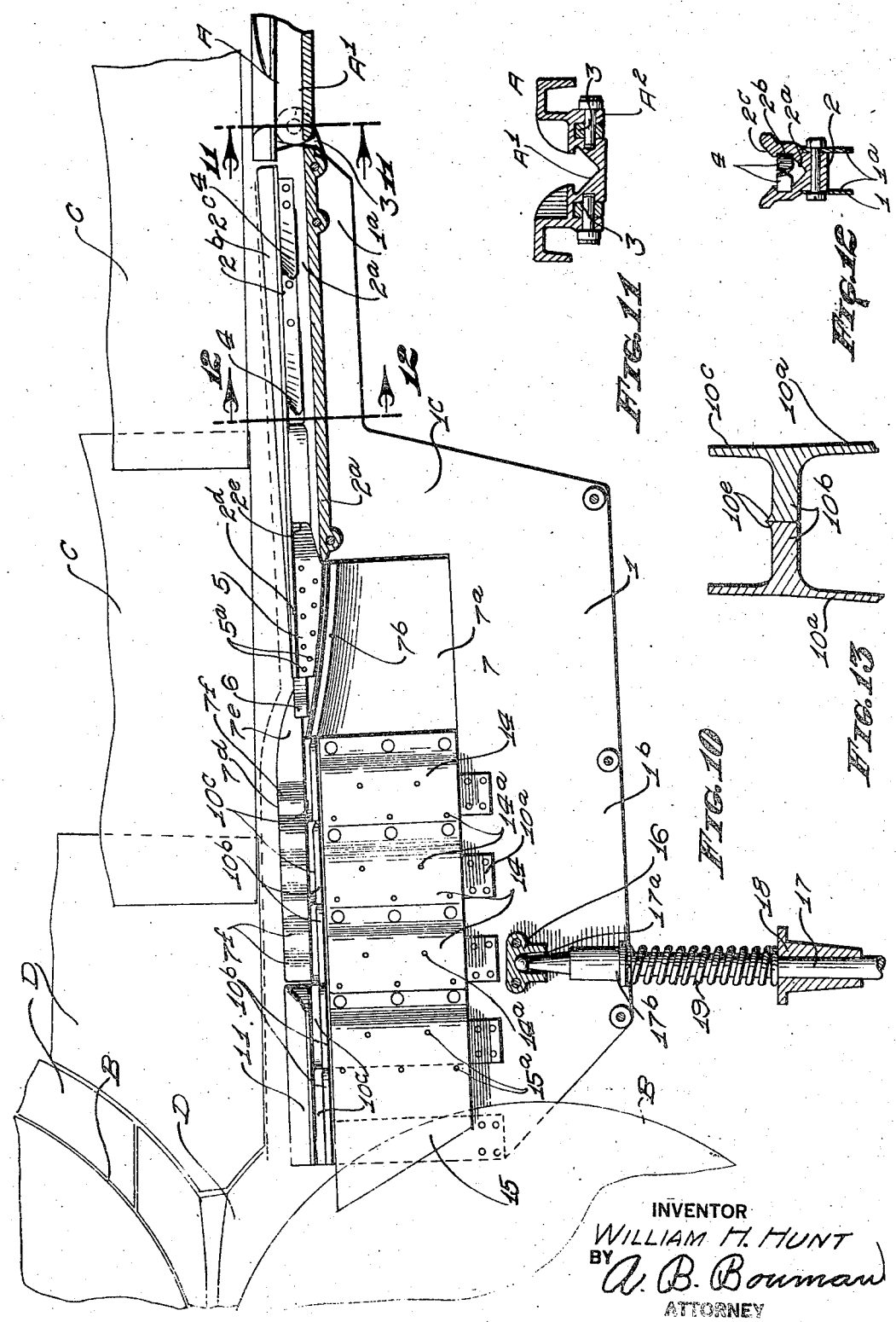
INVENTOR
WILLIAM H. HUNT
BY
A. B. Bowman
ATTORNEY Patented Nov. 1, 1932

1,885,829

UNITED STATES PATENT OFFICE

WILLIAM H. HUNT, OF NATIONAL CITY, CALIFORNIA

FISH FIN AND TAIL GUIDE MEANS FOR FILLETING MACHINES

Application filed January 15, 1931. Serial No. 508,899.

My invention relates to fish fin and tail guide means for filleting machines, and the objects of my invention are:

First, to provide a fish fin and tail guide means which is particularly adapted for operation in conjunction with my fish bone removing machine, Serial Number 381,833; fish final positioning means, Serial Number 386,545; fish preliminary positioning means, Serial Number 478,079; and my fish dorsal fin centering means, Serial Number 496,210.

Second, to provide a fish fin and tail guide means which directs or guides the back fins and tail fins of a fish accurately between pairs of closely positioned, revoluble cutting blades;

Third, to provide a means of this class which directs the tail fins between the blades at one level and the back fins at another level;

Fourth, to provide a means of this class which spreads the back fins as they enter between the blades so that the thickness of the fins is reduced to a minimum, thereby facilitating entrance between closely positioned blades;

Fifth, to provide a means of this class which receives and acts upon fish passing tail first therethrough;

Sixth, to provide a means of this class which centers and guides the fins and tails of fish which are moving with extreme rapidity over the device, thereby facilitating rapid handling of the fish;

Seventh, to provide a device of this class in which even the most delicate fish are not crumpled or otherwise distorted;

Eighth, to provide a device of this class in which scales or other portions of the fish which might become separated therefrom cannot lodge so as to clog or jam the guide means;

Ninth, to provide a device of this class which enables the cutting blades to be positioned so close together that the maximum amount of meat is removed from the fish;

Tenth, to provide a means of this class which, without adjustment, may handle a wide variety of types of fish so that the different sizes may pass over the device; and Eleventh, to provide on the whole a novelly constructed fish fin and tail guiding means which is particularly simple of construction proportional to its functions, durable, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:—

Figure 1 is a side elevational view of my fish fin and tail guide means detached from the rest of a fish filleting machine;

Fig. 2 is an enlarged transverse sectional view thereof through 2—2 of Fig. 1, with parts and portions shown in elevation;

Fig. 3 is a fragmentary sectional view taken along the same line as that of Fig. 2, and showing the fin diverting gates open, as when the fins of the fish are passing at this point;

Fig. 4 is a transverse sectional view through 4—4 of Fig. 1, as the parts appear when not in use;

Fig. 5 is a sectional view taken at substantially the same point, with parts and portions shown in elevation, and showing the arrangement of the various members during the interval in which the tail portion of the fish is passing;

Fig. 6 is a sectional view through 6—6 of Fig. 1, showing the arrangement of these members when the body of the fish is passing therethrough;

Fig. 7 is an enlarged fragmentary plan view;

Fig. 8 is an enlarged sectional view taken through 8—8 of Fig. 1, with parts and portions shown in elevation to facilitate the illustration;

Fig. 9 is a plan view showing the upper portion of the fin diverting gates and the several tail fin carrying ledges, with parts and portions removed to facilitate the illustration;

Fig. 10 is a longitudinal sectional view substantially along the median line of the fish fin and tail centering means, with parts and portions shown in elevation, and also showing the relation thereof to the cutting blades, the final positioning means, and preliminary positioning means, and the dorsal fin centering means, more fully described in my co-pending applications;

Fig. 11 is a transverse sectional view thereof through 11—11 of Fig. 10, showing the manner of joining the fish fin and tail guide means to the dorsal fin centering means;

Fig. 12 is a sectional view through 12—12 of Fig. 10; and

Fig. 13 is an exaggerated sectional view of a pair of the tail fin carrying ledges.

Similar characters of reference refer to similar parts and portions throughout the several views of the drawings.

Side plates 1, trough member 2, hinge brackets 3, centering fingers 4, 5, and 6, fin diverting gates 7, tension arms 8, tension springs 9, tail guide members 10, body supporting rails 11, tension set screws 12, brackets 13, fin spreader plates 14, fin guide plates 15, socket member 16, rod 17, bushing 18, and spring 19 constitute the principal parts and portions of my novel fish fin and tail guide means for filleting machines.

Two side plates 1 are provided, which are for the most part flat. These side plates are arranged in parallel, vertically disposed relation. Each side plate comprises oppositely extending vertically offset arm portions 1a and 1b, connected near the central portion of the side plate by a web 1c.

The arm 1a extends towards the receiving end of the fish fin and tail guide means, and supports therebetween a trough member 2, which also serves to properly space the side members. The trough member 2 is provided with a longitudinally extending V-shaped trough portion 2a, which forms a continuation of the trough portion A1 of my fish dorsal fin centering means A, more fully disclosed in my co-pending application, Serial Number 496,210.

At the rear or receiving end, my guide means is provided with rearwardly extending brackets 3, which are adapted to co-act with hinge elements A2 of the dorsal fin centering means A and receive hinge pins so that the guide means is capable of limited arcuate movement in a vertical plane.

Above the V-shaped trough portion 2a, the side walls of the trough member form narrow vertically extending portions 2b. Supported therealong are one or more pairs of centering fingers 4. Each centering finger is formed of springy material and is secured at its rear portion. Each pair of centering fingers converges forwardly from their supported ends until at their forward tips, the members of each pair are in mutual contact, as shown in Figs. 7 and 12.

These fingers serve to maintain the tail fins and dorsal fins of the fish in centered relation with the trough member. Above the fingers the trough member is provided with outwardly diverging marginal portions 2c, which are adapted to support the fish on its back at either side of the dorsal fins.

The side walls of the trough member 2 project forwardly of the trough portion 2a, forming parallel disposed arm portions 2d. Between these arm portions and extending from the discharge or forward end of the trough portion 2a is a pair of resilient centering fingers 5, shown in Figs. 2, 3, 7, and 10. The operating portions of these fingers converge gradually towards their forward ends where they resiliently engage each other. The inner sides of their operating portions are provided with a plurality of small projections 5a. From their operating portions rearwardly the fingers 5 converge and extend through slots 2e provided in the side walls of the trough member 2. Once through the slots, they extend along the outer sides of the trough member 2 and are secured thereto. Forwardly beyond the centering fingers 5, and beyond the extremities of the arms is a smaller pair of centering fingers 6. The webs 1c are arranged below the forward extremity of the trough portion 2a. Along the lower margin of each offset arm 1b adjacent the web 1c and below the arms 2d of the trough member 2, is a hinge element 1d. Hinged to each hinge element and extending upwardly therefrom is a supporting arm 7a of a fin diverting gate 7. Each arm 7a is relatively wide and flat, and extends upwardly along the outer side of the offset portion 1b until clear of the upper edge thereof, whereupon it slants slightly inwardly. The upper portion of each gate arm is provided with an inwardly extending ledge 7b. The rear end or beginning of each ledge is slightly below the bottom of the V-shaped trough 2a. Each ledge 7b as it extends forwardly therefrom, slopes upwardly, its transverse plane remaining substantially horizontal, as shown best in Figs. 10 and 2.

The bottom edges of the centering fingers 5 are contiguous to and conform to the curvature of the ledges 7b. The inner edges of each ledge 7b are normally in contact with each other, and form the gateway of the fish diverting means.

Along its inner edge, one ledge is provided with a projection which fits in a corresponding depression along the upper margin of the opposite ledge, as shown in Figs. 2 and 3, so that when the ledges are in contact with each other, the guard edge cannot spread the gate members apart. The outer margins of the ledges 7b are provided with upwardly extending walls 7c, which barely clear the under sides of the overhanging or projecting arm portions 2d of the trough member 2, as shown best in Fig. 1. The retaining fingers 5 are between the walls 7b, while the fingers 6 extend over the tops of the walls 7b.

Each fin gate arm 7a is engageable by a tension arm 8, which may be mounted on the hinge pins which support the gate arms 7a. At the extended end of each tension arm 8, there is provided a set screw 8a which is adapted to engage the corresponding gate arm 7a. Secured to the hinge elements 1d or any other suitable place, is a leaf spring 9, which is adapted to bear against the corresponding tension arm 8. Stops 1e may be provided for limiting the outward movement of the diverting gates.

A plurality of tail guide members 10 are provided. Each tail guide member has substantially the form of an inverted L. The longer leg is springy and forms a supporting strip 10a. Formed along the shorter leg of the L at the inner side is a ledge 10b. The ledge 10b is spaced from the extremity of the tail guide member 10, leaving a wall 10c. The tail guide members 10 are arranged in pairs and secured by the extremities of the supporting strips 10a to the upper margin of the offset portion 1b. The several pairs of ledges 10b are arranged end to end in contiguous relation to each other. The supporting strips 10a hold the pairs of ledges in yieldable contact with each other, so that a pair of ledges 10b with their side walls 10c form a channel or trough for the tail fins. The shorter leg of each tail guide member extends rearwardly from the supporting strip, as shown in Fig. 10. Thus, the rear or entering edges of the pairs of ledges require a lesser force to spread them apart than do the forward portions thereof. To enable the pairs of ledges to readily spread by reason of pressure on their rear edges, these edges are rounded as indicated by 10d. However, it is not desired to have these ledges spread because of downward pressure upon them. To minimize this, the adjacent edges of the ledges 10b are provided with slight ridges 10e, as shown in Fig. 13. In order to prevent the tail fins, which ride upon the ledges, from working outside the side walls 10c, these side walls at their forward discharge ends converge, as indicated by 10f. For the same reason, the entering or rear portions of the rearmost pair of tail fin guide members are flared outwardly, as indicated by 10g. The tension between the pairs of ledges 10b is regulated by set screws 12, which are supported by brackets 1f from the offset portion 1b.

The forward portions of the walls 7c of the gate members 7 converge so that within the normal limits of movement of the gate members, the discharge ends are closer than the flared receiving ends 10g of the first tail guide members. Extending upwardly from the forward or discharge ends of the gate ledges 7b until clear of the fin guide members 10, and then extending forwardly over several of these members, is a pair of gate spreading jaws 7d. At their receiving or rear ends 7e, the spreading jaws 7d follow the convergence of the walls 7c and continue beyond the walls 7c until they meet. Forwardly from the converging portions 7e, the jaws are provided with coarse, blunt complementary teeth 7f, as shown best in Figs. 7 and 9. When the teeth 7f are interlocked, so as to overlap the median line of the guide means, the diverting gates are closed. These spreading jaws 7d are separated by the tail of a fish passing over the guide means so that the fins drop through the gate rather than follow the tail and ride on the ledges 10b.

The spreading jaws extend high enough so as to engage the stronger portions of the fish tail and when their primary function is completed, they help support the body of the fish. Forwardly of the spreading jaws 7d, there are provided body supporting rails 11 which assist in supporting the weight of the fish.

Arranged in alternate relation with the supporting strips 10a, and extending upwardly from the offset portions 1b of the side plates 1 are supporting brackets 13. Between each transverse pair of the brackets 13, there is supported a pair of fin spreader plates 14. These spreader plates are relatively wide. Each plate at first curves out abruptly from its supporting bracket 13, and then curves forwardly until at a small acute angle with respect to the median line of the guide means. Thus, the operating portions of each pair of fin spreader plates 14 converge gradually towards the discharge end of the guide means, and are normally in resilient contact, the plates being formed of suitable spring material.

It is preferred to omit the bracket 13 between the last two pair of supporting strips; instead, the forward pair of brackets 13 is provided with a pair of thin guide plates 15. It is preferred to omit the brackets 13 between the discharge or forward pairs of supporting strips, and substitute a pair of thin guide plates 15, which are similar to the fin spreader plates 14, but are longer and more pliable, and furthermore extend between a pair of cutting blades B, as shown in Fig. 8. The spreader plates 14 are provided with small projections 14a on their inner surfaces, which not only help to spread the fins but retain them in such spreaded position. The guide plates 15 are likewise provided with projections 15a.

Secured between the side plates 1 as far forward as possible is a socket member 16, which opens downwardly. Extending upwardly into the socket 16 is a round head portion 17a of a supporting rod 17. The supporting rod extends downwardly through a suitable bushing 18 supported by the framework of the machine with which my guide means is used. The rod 17 is fitted with a supporting spring 19, which bears against a shoulder 17b provided on the supporting rod 17, and against the bushing 18, as shown in Fig. 10.

Normally the guide means occupies a position substantially as that shown by dotted lines in Fig. 10. The weight of the fish passing over the guide means causes the guide means to depress in proportion to the weight of the fish, so that the longitudinal axis of the various fish, although of different size, occupy a substantially constant plane so as to enter between the cutting blades at the proper point.

Operation of my fish guide means is as follows:—

The fish passing from the dorsal fin centering means A are carried tail first, back down, with their fins in collapsed position, and riding in the trough A1. The fish is held in position by a preliminary retaining means, disclosed more clearly in my co-pending application, Serial Number 478,079. As the fish passes over the receiving end of the guide means, the fins are still retained in centered relation by the centering fingers 4. The fin diverting gates 7 are normally closed; hence, the tail being first rides along the ledges 7b, as shown in Fig. 2, and is guided thereby onto the ledges 10b. The fin engages the teeth of the spreading jaws 7d, causing the jaws to spread apart, as shown in Fig. 5. These spreading jaws are high enough to strike the fish above the lower edges of the tail so that there is little or no danger of crumpling; furthermore, the force needed to spread the diverting gates need not be very great. About the time the gates 7 spread apart, the first dorsal fin of the fish reaches the end of the trough 2a, and being unsupported, tends to spread out. The fingers 5, by reason of the projections 5a, tend to spread the fins as they pass to their extended positions. This spreading action is continued and maintained by the plates 14, and guide plates 15 until the fins are safely between the cutting blades B.

It will be noted that the tail enters at one level and the dorsal fins enter at a lower level; this is particularly desirable as it is desired to have the tail enter in substantially centered relation between the upper and lower sets of cutting blades.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a fish fin and tail guide means for fish filleting machines, a guide, a fin diverting gate forming a section of said guide, and gate opening means associated with said guide operable by the tail portion of a fish after passing said gate means, whereby the fins of said fish are diverted from said guide.

2. In a fish fin and tail guide means for fish filleting machines, a guide, a fin diverting gate forming a section of said guide, gate opening means associated with said guide operable by the tail portion of a fish after passing said gate means, whereby the fins of said fish are diverted from said guide, and a fin spreading means engageable with the fins of said fish after passing said fin diverting gate.

3. In a fish fin and tail guide means for fish filleting machines, a frame, hinge means supporting said frame at its receiving end, yieldable means supporting said frame at its other end, a guide carried by said frame, a fin diverting gate forming a section of said guide, and gate opening means associated with said guide operable by the tail portion of a fish after passing said gate means, whereby the fins of said fish are diverted from said guide.

4. In a fish fin and tail guide means for fish filleting machines, a frame, hinge means supporting said frame at its receiving end, yieldable means supporting said frame at its other end, a guide carried by said frame, a fin diverting gate forming a section of said guide, gate opening means associated with said guide operable by the tail portion of a fish after passing said gate means, whereby the fins of said fish are diverted from said guide, and a fin spreading means engageable with the fins of said fish after passing said fin diverting gate.

5. In a fish fin and tail guide means for fish filleting machines, a fin diverting means, tail carrying ledges continuing from said fin diverting means, said tail carrying ledges arranged in pairs, yieldable means normally holding said pairs of ledges in mutual contact, whereby the tail of a fish rides thereon, said fin diverting means normally in a position to conduct the tail of a fish onto said tail carrying ledges, and means for shifting said fin diverting means whereby the fins of a fish pass between the members of said pairs of tail carrying ledges, said shifting means arranged over said tail carrying ledges and operable by the tail of said fish.

6. In a fish fin and tail guide means for fish filleting machines, a fin diverting means, tail carrying ledges continuing from said fin diverting means, said tail carrying ledges arranged in pairs, yieldable means normally holding said pairs of ledges in mutual contact, whereby the tail of a fish rides thereon, said fin diverting means normally in a position to conduct the tail of a fish onto said tail carrying ledges, means for shifting said fin diverting means whereby the fins of a fish pass between the members of said pairs of tail carrying ledges, said shifting means arranged over said tail carrying ledges and operable by the tail of said fish, and a fin spreading means arranged below said tail carrying ledges.

7. In a fish fin and tail guide means for fish filleting machines, a frame, hinge means supporting said frame at its receiving end, yieldable means supporting said frame at its other end, a fin diverting means carried by said frame, tail carrying ledges continuing from said fin diverting means, said tail carrying ledges arranged in pairs, yieldable means normally holding said pairs of ledges in mutual contact whereby the tail of a fish rides thereon, said fin diverting means normally in a position to conduct the tail of a fish onto said tail carrying ledges, and means for shifting said fin diverting means whereby the fins of a fish pass between the members of said pairs of tail carrying ledges, said shifting means arranged over said tail carrying ledges and operable by the tail of said fish.

8. In a fish fin and tail guide means for fish filleting machines, a frame, hinge means supporting said frame at its receiving end, yieldable means supporting said frame at its other end, a fin diverting means carried by said frame, tail carrying ledges continuing from said fin diverting means, said tail carrying ledges arranged in pairs, yieldable means normally holding said pairs of ledges in mutual contact whereby the tail of a fish rides thereon, said fin diverting means normally in a position to conduct the tail of a fish onto said tail carrying ledges, means for shifting said fin diverting means whereby the fins of a fish pass between the members of said pairs of tail carrying ledges, said shifting means arranged over said tail carrying ledges and operable by the tail of said fish, and a fin spreading means arranged below said tail carrying ledges.

9. In a fish fin and tail guide means, a fish supporting guide, fin and tail centering fingers associated with said guide, a fin diverting gate extending from the discharge end of said guide, a tail carrying guide continuing from said fin diverting gate, yieldable means normally holding said gate closed whereby said gate forms a means for carrying said tail from said fish supporting track to said tail carrying track, and gate opening means arranged over said tail carrying guide and operable by the passing of said tail therethrough.

10. In a fish fin and tail guide means, a frame, hinge means supporting the receiving end of said frame, yieldable means supporting the discharge end of said frame, a fish supporting guide carried by said frame, fin and tail centering fingers associated with said guide, a fin diverting gate extending from the discharge end of said guide, a tail carrying guide continuing from said fin diverting gate, yieldable means normally holding said gate closed whereby said gate forms a means for carrying said tail from said fish supporting guide to said tail carrying guide, and gate opening means arranged over said tail carrying guide and operable by the passing of said tail therethrough.

11. In a fish fin and tail guide means, a fish supporting guide, fin and tail centering fingers associated with said guide, a fin diverting gate extending from the discharge end of said guide, a tail carrying guide continuing from said fin diverting gate, yieldable means normally holding said gate closed whereby said gate forms a means for carrying said tail from said fish supporting guide to said tail carrying guide, said fin carrying guide comprising pairs of ledges, and yieldable means for holding the members of each pair of ledges in mutual contact, and gate opening means arranged over said tail carrying guide and operated by the passing of said tail therethrough, whereby the said fins are diverted between said ledges.

12. In a fish fin and tail guide means, a fish supporting guide, fin and tail centering fingers associated with said guide, a fin diverting gate extending from the discharge end of said guide, a tail carrying guide continuing from said fin diverting gate, yieldable means normally holding said gate closed whereby said gate forms a means for carrying said tail from said fish supporting guide to said tail carrying guide, said fin carrying guide comprising pairs of ledges, yieldable means for holding the member of each pair of ledges in mutual contact, and gate opening means arranged over said tail carrying guide and operated by the passing of said tail therethrough, whereby the said fins are diverted between said ledges, and fin spreading means arranged below and between said pairs of ledges.

13. In a fish fin and tail guide means, a guide, a fin diverting gate forming a section of said guide, and a gate opening means associated with said guide operable by the passing of a fish over said guide, whereby the fins of said fish are diverted from said guide.

14. In a fish fin and tail guide means for fish filleting machines, a fin diverting means, tail carrying ledges continuing from said fin diverting means, said tail carrying ledges arranged in pairs, yieldable means normally holding said pairs of ledges in mutual contact, whereby the tail of a fish rides thereon, said fin diverting means normally in a position to conduct the tail of a fish onto said tail carrying ledges, and means for shifting said fin diverting means whereby the fins of a fish pass between the members of said pairs of tail carrying ledges.

In testimony whereof, I have hereunto set my hand at San Diego, California, this 21st day of November, 1930.

WILLIAM H. HUNT.